(12) United States Patent
Agudo et al.

(10) Patent No.: US 7,985,824 B1
(45) Date of Patent: Jul. 26, 2011

(54) METHOD OF MAKING POLYCARBONATE (75) Inventors: Jorge Garcia Agudo, Murcia (ES);
Ignacio Vic Fernandez, Murcia (ES);
David Domingo Fuster, Oviedo (ES);
Miguel Angel Salomon, Murcia (ES)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/730,441

(22) Filed: Mar. 24, 2010

(51) Int. Cl.
*C08G 64/00* (2006.01)
*C08G 63/02* (2006.01)
(52) U.S. Cl. .................... 528/196; 528/198; 548/472
(58) Field of Classification Search .............. 528/196, 528/198; 548/472
See application file for complete search history.

(56) References Cited

U.S. PATENT DOCUMENTS

| 7,041,775 | B2 | 5/2006 | Martinez et al. |
| 7,495,064 | B2 | 2/2009 | Domingo et al. |
| 2008/0287640 | A1 | 11/2008 | Belfadhel et al. |
| 2009/0105443 | A1 | 4/2009 | Brack et al. |

*Primary Examiner* — Terressa M Boykin
(74) *Attorney, Agent, or Firm* — Cantor Colburn LLP (57) ABSTRACT

A method of making a polycarbonate is described. The method comprises reacting an activated diaryl carbonate and a dihydroxy compound at a reaction temperature in a reactor to form a reaction mixture wherein the reactor comprises a heated cover and an open space between the cover and the reaction mixture. The dihydroxy compound comprises a vapor pressure greater than or equal to 0.01 kiloPascals at the reaction temperature and the temperature of the open space in the reactor, the temperature of the cover, or the temperature of the open space and the cover is greater than or equal to the melt temperature of the monomer having the highest melt temperature.

18 Claims, 6 Drawing Sheets

METHOD OF MAKING POLYCARBONATE

BACKGROUND

Polycarbonate is a thermoplastic that has excellent mechanical properties such as impact resistance, heat resistance and transparency. Polycarbonate is widely used in many engineering applications. Polycarbonates may be prepared by several processes including a melt process in which a carbonic diester is polymerized in a multistage reactor in the presence of a dihydroxy compound to yield a molten polycarbonate. Polycarbonate can also be prepared in a melt process by reacting a dihydroxy compound and an activated diaryl carbonate. New methods and apparatus for making polycarbonate are continually needed.

BRIEF DESCRIPTION

A method of making polycarbonate comprises reacting an activated diaryl carbonate and a dihydroxy compound in a reactor to form a reaction mixture. The reactor comprises a heated cover and an open space between the cover and the reaction mixture. The dihydroxy compound comprises a vapor pressure greater than or equal to 0.01 kiloPascals at the reaction temperature. The temperature of the open space, the temperature of the cover or the temperature of the open space and the cover is maintained at a temperature sufficient to prevent accumulation of the activated diaryl carbonate, the dihydroxy compound, or both on the cover. For example, the temperature of the open space, the cover, or both can be greater than or equal to the melt temperature of the monomer having the highest melt temperature.

DETAILED DESCRIPTION

Figure 1:
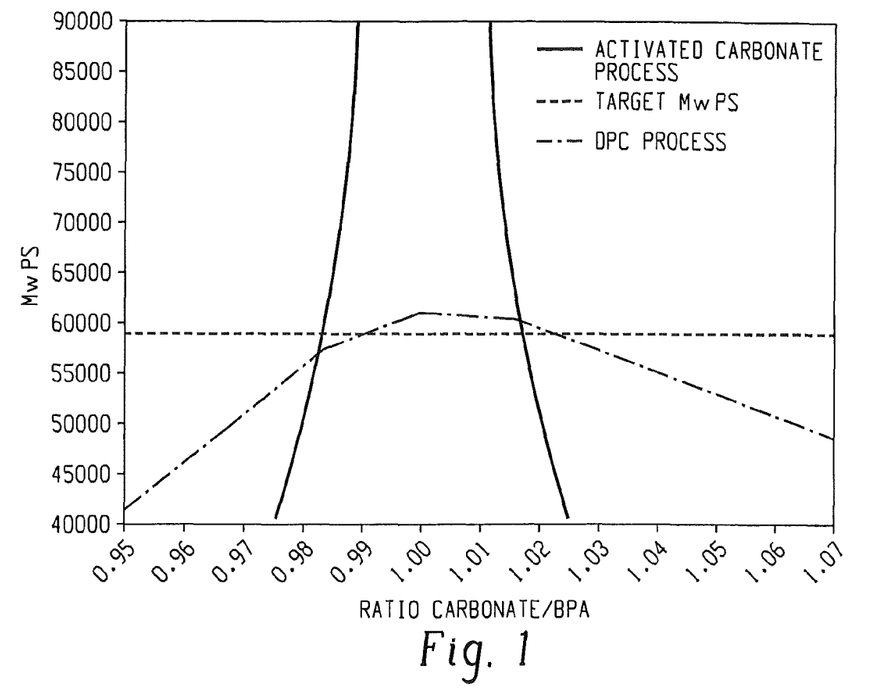
FIG. 1 is graph illustrating the molecular weight sensitivity when the molar ratio of carbonate to BPA is varied.

Polycarbonate can be produced in melt in a reactor or in a series of reactors where reaction conditions, temperatures, and pressures are modified to make polymer chains grow and decrease the amount of free monomer present in the reaction mixture. The melt polymerization process based on activated diaryl carbonate, which has a high reactivity, enables the incorporation of a large variety of monomers into the polymer chain because of the high reactivity of the carbonate donor. The molecular weight of the polymer in the melt polymerization process based on activated diaryl carbonate can be varied by changing the molar ratio of the carbonate to the dihydroxy compound (i.e., stoichiometry). Small changes in this ratio can cause large differences in molecular weight as illustrated in FIG. 1. FIG. 1 displays a graph illustrating a comparison of the molecular weight sensitivity to molar ratio variation in the melt polymerization process with a diphenyl carbonate versus the melt polymerization process with an activated diaryl carbonate (e.g., bismethylsalicyl carbonate (BMSC)). As can be seen in FIG. 1, changes in the molar ratio of the activated diaryl carbonate to the dihydroxy compound (e.g., bisphenol A (BPA)) can create large differences in the molecular weight of the polymer as compared to melt polymerization using diphenyl carbonate.

Thus, the rate of change of molecular weight (Mw) compared to the molar ratio (MR) of carbonate to the dihydroxy compound can be used to determine whether or not a given diaryl carbonate is activated. This is given by the following equation in which the absolute value of the ratio of molecular weight to molar ratio of a non-activated diaryl carbonate (e.g., diphenyl carbonate) is less than 1.5 times the absolute value of the ratio of molecular weight to molar ratio of an activated diaryl carbonate.

$$\text{ABS}\left(\frac{dMw}{dMR}\right)_{DIARYLCARBONATE} < 1.5 \cdot \text{ABS}\left(\frac{dMw}{dMR}\right)_{ACTIVATEDDIARYLCARBONATE}$$

In an industrial scale polymerization reaction using an activated diaryl carbonate and a dihydroxy compound having a vapor pressure at the reaction temperature, sudden peaks in final molecular weight were observed even though reaction conditions were held constant. Investigation resulted in the conclusion that stoichiometric control of the polymerization reaction was compromised. Surprisingly it was discovered that the temperature distribution in the reactor was not consistent. Inconsistency in temperature throughout the reactor allowed free monomer to accumulate in colder areas of the reactor cover or in the open space of the reactor (e.g., vapor space, the space located between the cover and the reaction mixture, or on the cover itself) until a portion or all of the accumulated free monomer dropped back into the reaction mixture. This resulted in the molecular weight peaks observed in FIG. 1 with the activated carbonate process. It is theorized that free monomer devolatilized from the reaction mixture and then deposited, accumulated, and returned to the reaction mixture in batches, thus upsetting the consistent stoichiometric control of the reaction. Such observations were not made when conducting equivalent experiments using diphenyl carbonate rather than activated diaryl carbonate. This indicated that consistent stoichiometric control of the reaction was a factor to consider when melt polymerizing with an activated diaryl carbonate.

The methods disclosed herein can prevent the formation of monomer deposits in the open space of a reactor in a polycarbonate melt polymerization process by maintaining the temperature of the surface of the reactor that is exposed to the reaction vapors to a temperature that is greater than or equal to five degrees below the melting point of the highest temperature melting monomer used in the polymerization reaction. The temperature of the surface of the reactor exposed to the reaction vapors can be greater than or equal to the melting point of the monomer having the highest melt temperature. In one embodiment, the temperature of the surface of the reactor that is exposed to the reaction vapors can be maintained at a temperature less than or equal to 15° C. above the melting point of the highest temperature melting monomer used in the polymerization reaction. In some cases, the monomer with the highest melting point is hydroquinone. The temperature of the open space between the surface of the reaction mixture and the cover can be the same as the cover temperature as described above. It is also contemplated that the temperature of the open space can be less than the temperature of the cover. Additionally, it is contemplated that the temperature of the open space can fall within the ranges described above with regard to the cover but still differ from the temperature of the cover.

For example, when diphenyl carbonate (DPC) is used instead of an activated diaryl carbonate (e.g., bismethylsalicyl carbonate), deviations in molecular weight and difficulty in controlling molecular weight because of sudden changes in molar ratio of the carbonate to dihydroxy compound in the reactor are not observed. The DPC process can generally proceed for greater than a week or even greater than 10 days without problems due to stoichiometry. Without wishing to be bound by theory, it is theorized that a reason for the long running time of the DPC polymerization is due to the phenol by-products produced in the melt polycondensation reaction of DPC. The phenol by-products are a more efficient solvent for dihydroxy compounds such as bisphenol A and hydroquinone and are capable of dissolving any deposits of monomer such as hydroquinone, even though the cover of the reactor is not heated and the temperature of the cover is less than the melt temperature of monomer with the highest melt temperature.

Figure 8:
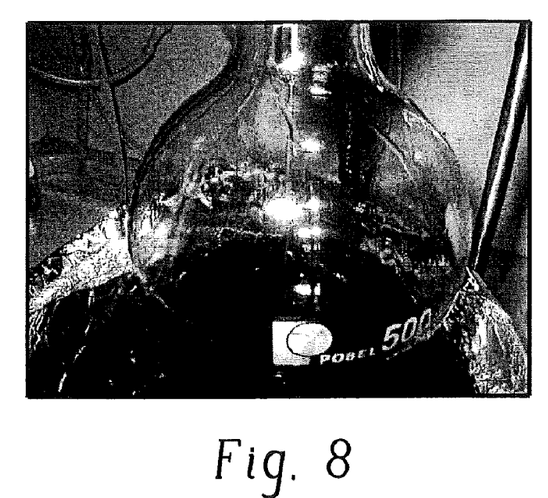
FIG. 8 is a picture illustrating the results when phenol carbonate is used as a dissolving media in a composition containing phenol and hydroquinone.
Figure 9:
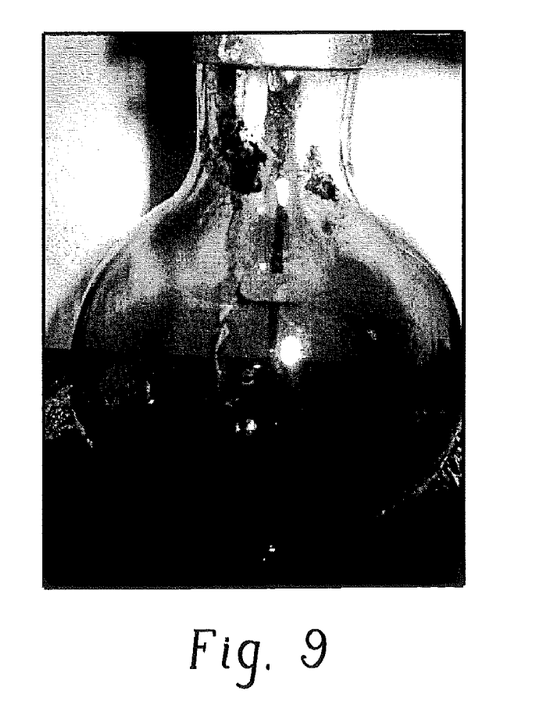
FIG. 9 is a picture illustrating the results when methylsalicylate is used as a dissolving media in a composition comprising methylsalicylate and hydroquinone.

However, the by-products produced when an activated carbonate such as bismethylsalicyl carbonate is used in the melt polycondensation reaction are not as capable as the phenol by-products of dissolving and removing dihydroxy compound deposits (such as hydroquinone deposits). FIGS. 8 and 9 illustrate this concept where phenol was used as the dissolving media in FIG. 8 and methylsalicylate (i.e., the by-product of bismethylsalicylate) was used as the dissolving media in FIG. 9. The bath temperature was 180° C. in each container and the wall temperature was 115° C. to 120° C. in each container. The container shown in FIG. 8 contained phenol and hydroquinone. As can be seen from FIG. 8, no deposits of hydroquinone were observed in the upper portion of the container (e.g., the neck area), supporting the theory that phenol by-products are capable of dissolving any hydroquinone that may deposit in the container. The container shown in FIG. 9 contained methylsalicylate and hydroquinone. FIG. 9 illustrates that deposits of hydroquinone were observed in the upper portion of the container, further supporting the theory that methylsalicylate is not as capable of phenol at dissolving deposits of hydroquinone. These results indicate why peaks in molecular weight are not observed when melt polymerizing polycarbonate with DPC but are observed when melt polymerizing polycarbonate with an activated diaryl carbonate, such as BMSC. Additionally the molecular weight dependency to molar ratio with DPC is lower.

Figure 4:
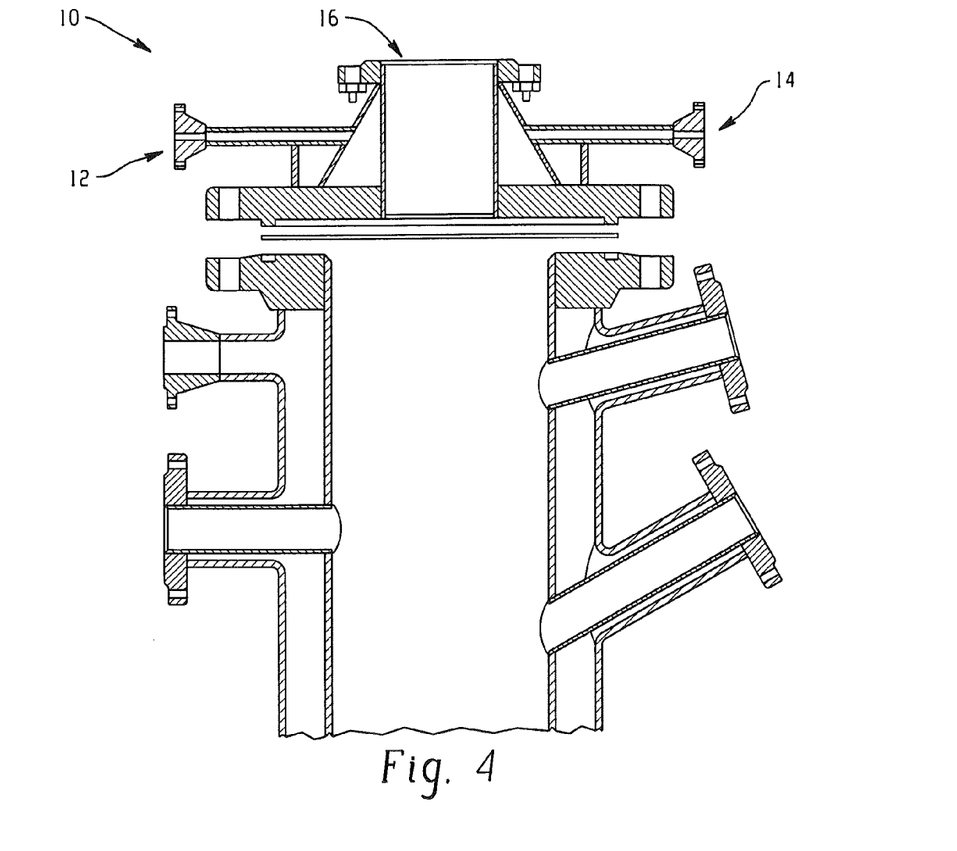
FIG. 4 is a view illustrating the heated reactor cover design disclosed herein.

The preceding information indicates the design of the reactor and the temperature of the open space and/or reactor cover are important to maintaining consistent stoichiometric control and hence consistent polymer molecular weight in activated diaryl carbonate melt polymerization. Use of a reactor design having a heated cover improves the quality of the polymer produced and decreases molecular weight variation in the final product since stoichiometry modification is avoided. As used herein a heated cover is inclusive of covers that are both heated and insulated. Additionally, the more even distribution of temperature in the reactor aids in preventing the formation of "hot spots" which can cause degradation of monomers, oligomers, and the final polymer. Providing a heated reactor cover provides a relatively even distribution of temperatures in the reactor (i.e., temperature homogeneity). It is also contemplated that using a heated reactor cover can provide the flexibility to use, with intent, two different temperatures in the reactor (e.g., one in the cover and one in the walls). FIG. 4 illustrates one example of a reactor (10) having a heated reactor cover (16). In FIG. 4, at least one inlet heating supply (12, 14) in communication with the reactor cover (16) is present.

In one embodiment, a molten reaction mixture comprising a dihydroxy compound, an activated diaryl carbonate, and a catalyst are contacted under melt polymerization conditions to form a polymer having a molecular weight ($M_w$) greater than 10,000 g/mol (molecular weights measured relative to polystyrene (PS) standards), or, more specifically greater than 18,000 g/mol. Unless otherwise described, molecular weights are reported as weight average molecular weight (Mw) and were determined using gel permeation chromatography (GPC) using polystyrene standards.

The term "contacting under melt polymerization conditions" will be understood to mean those conditions necessary to effect a reaction between the activated diaryl carbonate and the dihydroxy compound(s). The reaction temperature can be about 150° C. to about 350° C., specifically about 170° C. to about 310° C. The reaction is carried out in the presence of a catalyst system described below. The pressure can be at atmospheric pressure, supra atmospheric pressure, or a range of pressures, for example 15 ton to 2 atmospheres (2 kiloPascals (kPa) to 20 kPa) in the initial stages of the polymerization reaction, and at a reduced pressure at later stages, for example 0.1 ton to 15 torr (0.01 kPa to 2 kPa). The reaction time is generally 0.1 hour to 10 hours, specifically 0.1 to 5 hours.

The dihydroxy compound can be a $C_6$-$C_{90}$ hydrocarbon. The dihydroxy compound can comprise a single compound or a combination of compounds. The dihydroxy compound can be an aromatic dihydroxy compound, an aliphatic dihydroxy compound or a combination of aromatic and aliphatic dihydroxy compounds. Dihydroxy aromatic compounds can be selected from the group consisting of bisphenols having the structure of formula I, (I)

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$, aralkyl, $C_5$-$C_{20}$ cycloalkyl groups, or a combination thereof; dihydroxy benzenes having the structure of formula II (II)

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having the structures of formulas III and IV, respectively (III)

(IV)

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Bisphenols having the formula I that can be utilized include, but are not limited to 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hy- droxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene.

Dihydroxy benzenes having the structure of formula II can include hydroquinone, resorcinol, methylhydroquinone, butylhydroquinone, phenylhydroquinone, 4-phenylresorcinol and 4-methylresorcinol.

Dihydroxy naphthalenes having the structure of formula III can include 2,6-dihydroxy naphthalene; 2,6-dihydroxy-3-methyl naphthalene; and 2,6-dihydroxy-3-phenyl naphthalene, while dihydroxy naphthalenes having the structure of formula IV can include 1,4-dihydroxy naphthalene; 1,4-dihydroxy-2-methyl naphthalene; 1,4-dihydroxy-2-phenyl naphthalene and 1,3-dihydroxy naphthalene.

The relative amounts of dihydroxy compound can be selected based on the desired composition of the polycarbonate. If more than one dihydroxy compound is used, they can be added as part of the same feed, in a separate feed, or both. In one embodiment, a dihydroxy compound is used that has a vapor pressure that is greater than or equal to 0.01 kiloPascals at the reaction temperature (e.g., about 160° C.). In one embodiment, the reaction temperature is about 150° C. to about 190° C. and the reaction employs a dihydroxy compound having a vapor pressure of 0.004 kPa to 0.086 kPa. In another embodiment, the reaction temperature is about 150° C. to about 190° C. and the reaction employs hydroquinone having a vapor pressure of 0.67 kPa to 5.32 kPa.

The activated diaryl carbonate can be an activated diaryl carbonate or a mixture of an activated diaryl carbonate with a non-activated carbonate. In one embodiment, the activated diaryl carbonate is an ester-substituted diaryl carbonate such as bismethylsalicyl carbonate (BMSC). As used herein the term "activated carbonate" refers to a diaryl carbonate which is more reactive than diphenyl carbonate toward transesterification reactions. Such activated carbonates are of the structure of formula VI, (VI)

wherein Q and Q' are each independently activating groups. A and A' are each independently aromatic rings which can be the same or different depending on the number and location of their substituent groups, and n and n' are whole numbers of zero up to a maximum equivalent to the number of replaceable hydrogen groups substituted on the aromatic rings A and A', wherein A+A' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A' minus the number n'. The number and type of the R and R' substituents on the aromatic ring are not limited unless they deactivate the carbonate and lead to a carbonate which is less reactive than diphenylcarbonate. Typically, the location of the R and R' substituents on the aromatic ring are any one or any combination of the para and/or two ortho positions.

Non-limiting examples of activating groups Q and Q' are alkoxycarbonyl groups, halogens, nitro groups, amide groups, sulfone groups, sulfoxide groups, imine groups, or cyano groups with structures indicated below.

Q = Halogen or $NO_2$
Y = C, N, S, SO
Z = O, N
M = N-Dialkyl, Alkyl, Aryl, Aryloxy, Alkoxy
R1 = Alkyl or Aryl Specific and non-limiting examples of activated diaryl carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate, and bis(o-cyanophenyl)carbonate. Unsymmetrical combinations of these structures, where the substitution number and type on A and A' are different, are also contemplated. In one embodiment, the activated carbonate is an ester-substituted diaryl carbonate having the structure of formula X, (X)

wherein $R^1$ is independently at each occurrence a $C_1$-$C_{20}$ alkyl radical, $C_4$-$C_{20}$ cycloalkyl radical, or $C_4$-$C_{20}$ aromatic radical; $R^2$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and b is independently at each occurrence an integer from 0 to 4. At least one of the substituents $CO_2R^1$ can be attached in an ortho position relative to the carbonate group.

Examples of ester-substituted diaryl carbonates include but are not limited to bismethylsalicyl carbonate (CAS Registry No. 82091-12-1), bisethylsalicyl carbonate, bispropyl salicyl carbonate, bisbutylsalicyl carbonate, bisbenzylsalicyl carbonate, bis(methyl 4-chlorosalicyl)carbonate and the like. Bismethylsalicyl carbonate can be used in melt polycarbonate synthesis due to its lower molecular weight and higher vapor pressure.

The catalyst is introduced continuously in the reactor. The catalyst described herein can be a base comprising at least one source of alkaline earth ions or alkali metal ions, and/or at least one quaternary ammonium compound, a quaternary phosphonium compound, or a mixture thereof. The source of alkaline earth ions or alkali metal ions being used in an amount such that the amount of alkaline earth or alkali metal ions present in the reaction mixture can be about $10^{-5}$ to about $10^{-8}$ moles alkaline earth or alkali metal ion per mole of dihydroxy compound employed.

The quaternary ammonium compound is selected from the group of organic ammonium compounds having the structure of formula XI, (XI)

wherein $R^{20}$, $R^{21}$, $R^{22}$ and $R^{23}$ are each independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment, anion $X^-$ is selected from the group consisting of hydroxide, halide, carboxylate, sulfonate, sulfate, formate, carbonate, and bicarbonate.

Non-limiting examples of suitable organic ammonium compounds comprising formula XI are tetramethyl ammonium hydroxide, tetrabutyl ammonium hydroxide, tetramethyl ammonium acetate, tetramethyl ammonium formate and tetrabutyl ammonium acetate. In one embodiment, tetramethyl ammonium hydroxide is utilized.

The quaternary phosphonium compound is selected from the group of organic phosphonium compounds having the structure of formula XII, (XII)

wherein $R^{24}$, $R^{25}$, $R^{26}$ and $R^{27}$ are each independently a $C_1$-$C_{20}$ alkyl radical, $C_4$-$C_{20}$ cycloalkyl radical, or a $C_4$-$C_{20}$ aryl radical; and $X^-$ is an organic or inorganic anion. In one embodiment, anion $X^-$ is an anion selected from the group consisting of hydroxide, halide, carboxylate, sulfonate, sulfate, formate, carbonate, and bicarbonate. Organic phosphonium compounds comprising formula XII are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). In one embodiment, TBPA is utilized.

Where $X^-$ is a polyvalent anion such as carbonate or sulfate it is understood that the positive and negative charges in structures XI and XII are properly balanced. For example, where $R^{20}$, $R^{21}$, $R^{22}$ and $R^{23}$ in structure XI are each methyl groups and $X^-$ is carbonate, it is understood that $X^-$ represents $\frac{1}{2}(CO_3^{-2})$.

Where a second catalyst compound is employed to achieve the formation of polycarbonate using the method disclosed herein, an effective amount of quaternary ammonium and/or phosphonium catalyst desirably should be employed. The amount of quaternary ammonium and/or phosphonium catalyst employed is typically based upon the total number of moles of dihydroxy compounds employed in the polymerization reaction. When referring to the ratio of catalyst, for example phosphonium salt having the structure of formula XII, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. In one embodiment, the amount of organic ammonium or phosphonium salts of formulas XI or XII employed can be about $1 \times 10^{-2}$ to about $1 \times 10^{-5}$, specifically, about $1 \times 10^{-3}$ to about $1 \times 10^{-4}$ moles per mole of the dihydroxy compound(s). In one embodiment, phosphorus can be used in an amount of about $1 \times 10^{-4}$ to about $1 \times 10^{-8}$, specifically about $1 \times 10^{-4}$ to about $1 \times 10^{-7}$ moles of phosphorus containing compound per mole of the dihydroxy compound(s).

The reactants are combined and reacted in a formulation system. The formulation system is an apparatus comprising a means for melting the dihydroxy compound and the activated diaryl carbonate, a monomer feed line for delivering the reactants to a reactor, and a reactor. The formulation system can comprise more than one melting means, more than one monomer feed line, and more than one reactor. At least one reactor comprises a heated cover that can be maintained at a temperature sufficient to prevent the accumulation of monomer in the open space of the reactor or on the cover. When accumulation of a monomer on the cover is discussed herein it should be understood that this refers to the accumulation of a monomer on the interior surface of the reactor cover.

Several embodiments of the formulation system and means for mixing the reaction mixture are contemplated. The term "reactor" refers to any type of vessel, tank, receptacle, reactor, bed, or combinations thereof. More generally, the term "reactor" as used herein refers to the area wherein the dihydroxy composition and the activated diaryl carbonate composition react to form polycarbonate. In one embodiment, the reactor comprises a reactor having an open space (e.g., head space, vapor space, etc.) between the reaction mixture and the cover. The term "reactor" should not be construed to limit the scope of the claims to a specific type of device or to a specific number of devices. Thus non limiting examples of "reactors" are reactors, tanks, horizontal tubes, vertical tubes, tubes with and without internals, extruders, rotating disc type reactors (e.g. horizontal), continuously stirred tank reactors (CTSR), extruders, plug flow reactors, tubular reactors, flash tanks, thin film evaporators, and falling film evaporators, and the like.

The dihydroxy compound can be melted before its introduction into the formulation system with a melting apparatus. Care should be taken to prevent degradation of the dihydroxy compound, and the residence time of the dihydroxy compound at a high melting temperature should be limited because degradation of the dihydroxy compound can result in a colored polymer.

An apparatus suitable for melting a dihydroxy compound can have a relatively short residence time and a relatively low film temperature. This can be accomplished with a short residence time in a melting apparatus such as a thin film turbulizing melter. With a relatively short residence time it is meant a time less than 70% of the residence time in the formulation system, desirably less than 30%, and more desirably less than 10%. Particularly for degradation sensitive dihydroxy compounds, it is also desired to have essentially plug flow through the melting apparatus with a limited amount of backmixing to prevent broad residence time distribution.

The temperature, flow rate, and the mixing rate of the melting apparatus as well as the melting apparatus itself is selected so as to prevent substantial degradation of the dihydroxy compound and the activated diaryl carbonate.

Examples of suitable melting apparatus include but are not limited to thin film turbulizing melters, jacketed tubular melters with internal agitation, for example rotating discs or paddles, jacketed agitated vessels, jacketed agitated vessels with a recirculation line with or without a heat exchanger, jacketed screw conveyors, two phase shell and tube heat exchangers, extruders, and two phase static mixers.

In an embodiment two or more dihydroxy compounds are added in melted form to the reactor. They can be added as a mixture or in separate feeds. In one embodiment, a combination of dihydroxy compounds comprises bisphenol A and a second dihydroxy compound. The dihydroxy compound can comprise hydroquinone.

In one embodiment the melted dihydroxy compound is added to a stirred reactor, optionally with a recirculation line. The melted dihydroxy compound can be added to the reactor in different ways (i.e. from the top of the vessel by free fall into the liquid reaction mixture, through a dip pipe into the liquid reaction mixture or by side feed above or below the surface of the liquid reaction mixture). Combinations comprising at least one of the foregoing embodiments are also possible.

The activated diaryl carbonate can also be added to the reactor in different ways. In one embodiment the activated diaryl carbonate can be added as a liquid to the reactor from a holding vessel where the activated diaryl carbonate is kept in a liquid state. In another embodiment, the activated diaryl carbonate can be added as a solid. In yet another embodiment, the activated diaryl carbonate can be pre-melted in a melting apparatus similar to that contemplated for the melting of the dihydroxy compounds.

It is contemplated that the catalyst could be added with or without the activated diaryl carbonate. Non-limiting examples of addition modes are by direct injection of a catalyst solution in a solvent into the line, addition separately to the formulation system, or addition with a dihydroxy compound.

Melt polymerization of the polycarbonate is usually accomplished in one or more reactors and one or more stages. A first polymerization stage involves blending of the monomers in a first reactor to formulate a desired polymer composition and a target molar ratio. In one embodiment, a continuously stirred tank reactor (CTSR) can be used to provide a high degree of mixing and a more uniform composition ratio. Temperatures of the one or more reactors can be achieved by heat exchange from internal, external, or internal and external coils or heating jackets. Operating temperatures of the reactors can be less than or equal to 200° C. With the use of a heated cover, a substantially uniform temperature distribution can be achieved throughout the entire reactor.

Figure 3:
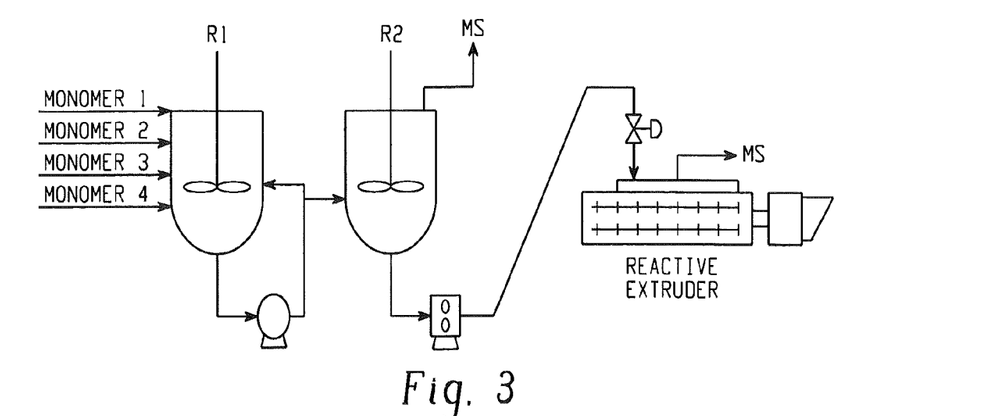
FIG. 3 is a schematic of an apparatus for making polycarbonate as disclosed herein.

FIG. 3 illustrates a schematic design for the methods disclosed herein wherein multiple reactors are present. In FIG. 3, monomer and catalyst are continuously added into the reactor R1 (here, a CSTR). R1 typically operates at close to atmospheric pressure and at temperatures of about 150° C. to about 190° C. Typically, the average residence time in R1 is 30 to 120 minutes. The R1 effluent is then fed into a second continuously stirred tank reactor (R2).

R2 typically operates in a pressure range of about 10 kPa to about 20 kPa (about 100 millibars (mbar) to about 200 mbar) and at temperatures of about 170° C. to about 200° C. The average residence time is typically approximately 30 minutes. Under these conditions, methylsalicylate is removed from the reaction media as a vapor, letting the reaction progress by chemical equilibrium displacement. The R2 effluent is pumped into a reactive extruder where polymerization is completed by full devolatilization of by-products such as methylsalicylate. Dynamic analysis of the molecular weight disparities displayed in FIG. 2 determined that the probable cause of the stoichiometry change was located in R1 but not in R2. R1 comprised an unheated reactor cover where the temperature of the cover was below the melting temperature of one of the dihydroxy compounds by greater than 5° C., while R2 was an unheated reactor cover where the temperature of the cover and the open space was greater than the melting temperature of the dihydroxy compound(s).

Figure 2:
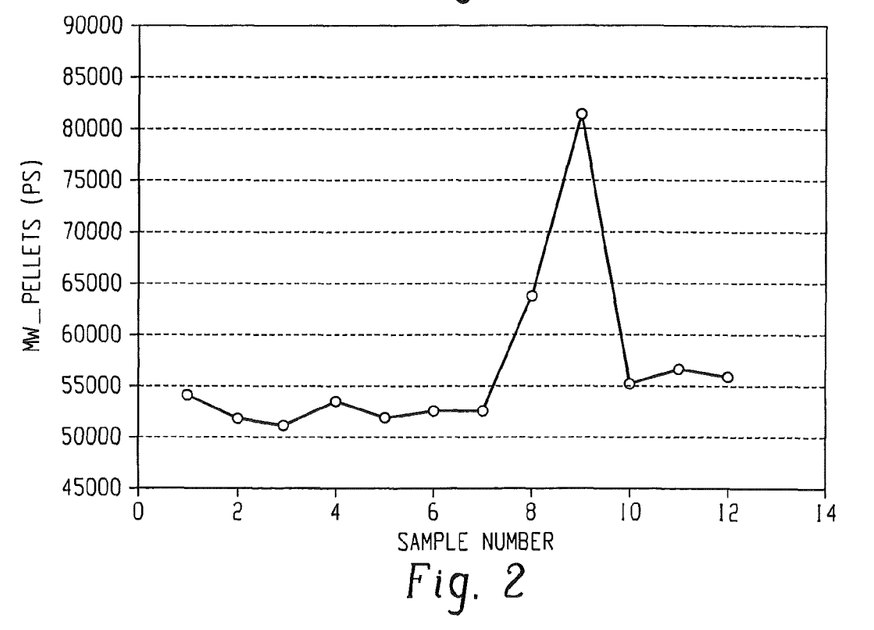
FIG. 2 is a graph illustrating a molecular weight peak in the final product when operating the reactor without a heated cover versus the sample number.

In one embodiment, the dihydroxy compound comprises hydroquinone, which generally has a melt temperature of about 175° C. and bisphenol A, which generally has a melt temperature of about 156° C. If the operating temperature of R1 is about 150° C. to about 190° C. as noted above, then the hydroquinone can have a relevant vapor pressure in R1. This is not an issue with bisphenol A because bisphenol A has a lower melt temperature and the vapor pressure is smaller (i.e., lower). As a result, it is likely that hydroquinone can deposit and accumulate on the cover of the reactor in R1, if the cover is not heated, and can fall back into the reaction mixture, thereby adjusting the rate of change of molecular weight to the molar ratio of the activated diaryl carbonate and causing a spike in the molecular weight of the monomer in R1 as illustrated in FIG. 2.

Figure 5:
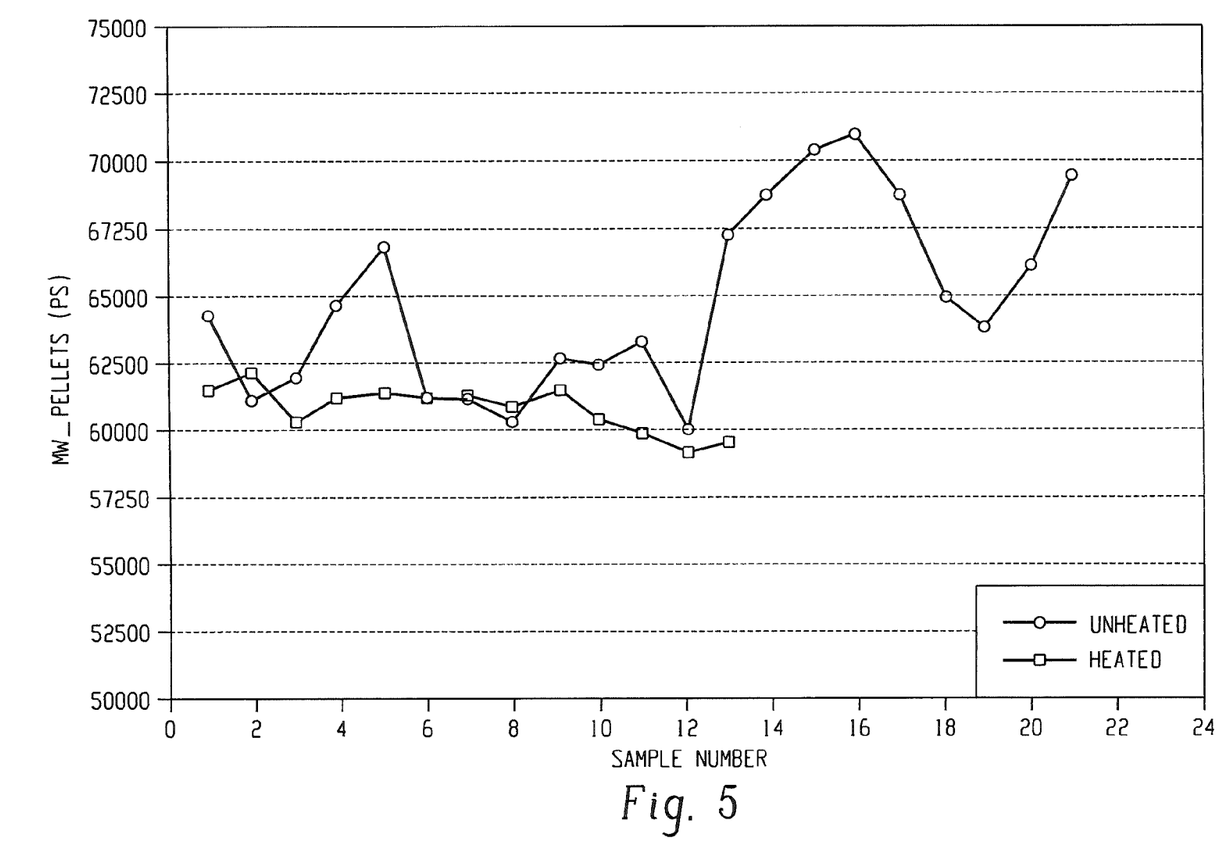
FIG. 5 is a graph illustrating the molecular weight stability achieved with the heated reactor cover disclosed herein and compared with the molecular stability obtained with an unheated cover.

FIG. 5 illustrates that the use of a modified cover design (e.g., a heated (i.e., jacketed) cover) can provide a more uniform temperature distribution throughout the reactor. FIG. 5 further illustrates that the melting temperature and vapor pressure of the activated diaryl carbonate and dihydroxy compound contribute to the operating temperature of the reactor, which in turn contribute to the temperature of the open space in the reactor located between the reaction mixture and the cover. Vapors, such as hydroquinone vapors, contacting a colder surface without a heated cover will accumulate and deposit back into the reaction mixture, thus causing a spike in the measured molecular weight. In one embodiment, the heated cover can comprise an inlet for receiving the same hot liquid supply as the reactor jacket. In another embodiment, the heated cover can be heated with a different hot liquid supply than the reactor jacket. In yet another embodiment, the heated cover can be heated by a combination of the same hot liquid supply for the reactor jacket and a different hot liquid supply. The reactor cover can be heated or heated and insulated to maintain the temperature of the surface of the reactor cover that is exposed to the vapors to at a temperature in the range from about 5° C. below the melting point of the highest temperature melting monomer used in the polymerization reaction to about 15° C. above the melting point of the highest temperature melting monomer used in the polymerization reaction.

FIG. 5 also illustrates the decrease in molecular weight variation that can be obtained by utilizing a heated reactor cover as described herein. FIG. 5 displays both the molecular weight variation in a process using an unheated cover and the molecular weight variation in a process using a heated cover. As can be seen in FIG. 5, the process using a heated cover displays a more constant molecular weight (i.e., a less varying molecular weight) and the unheated cover displays a varying molecular weight where the process conditions for both were identical and held constant.

The methods and polycarbonates are further illustrated by the following non-limiting examples.

EXAMPLES

Figure 6:
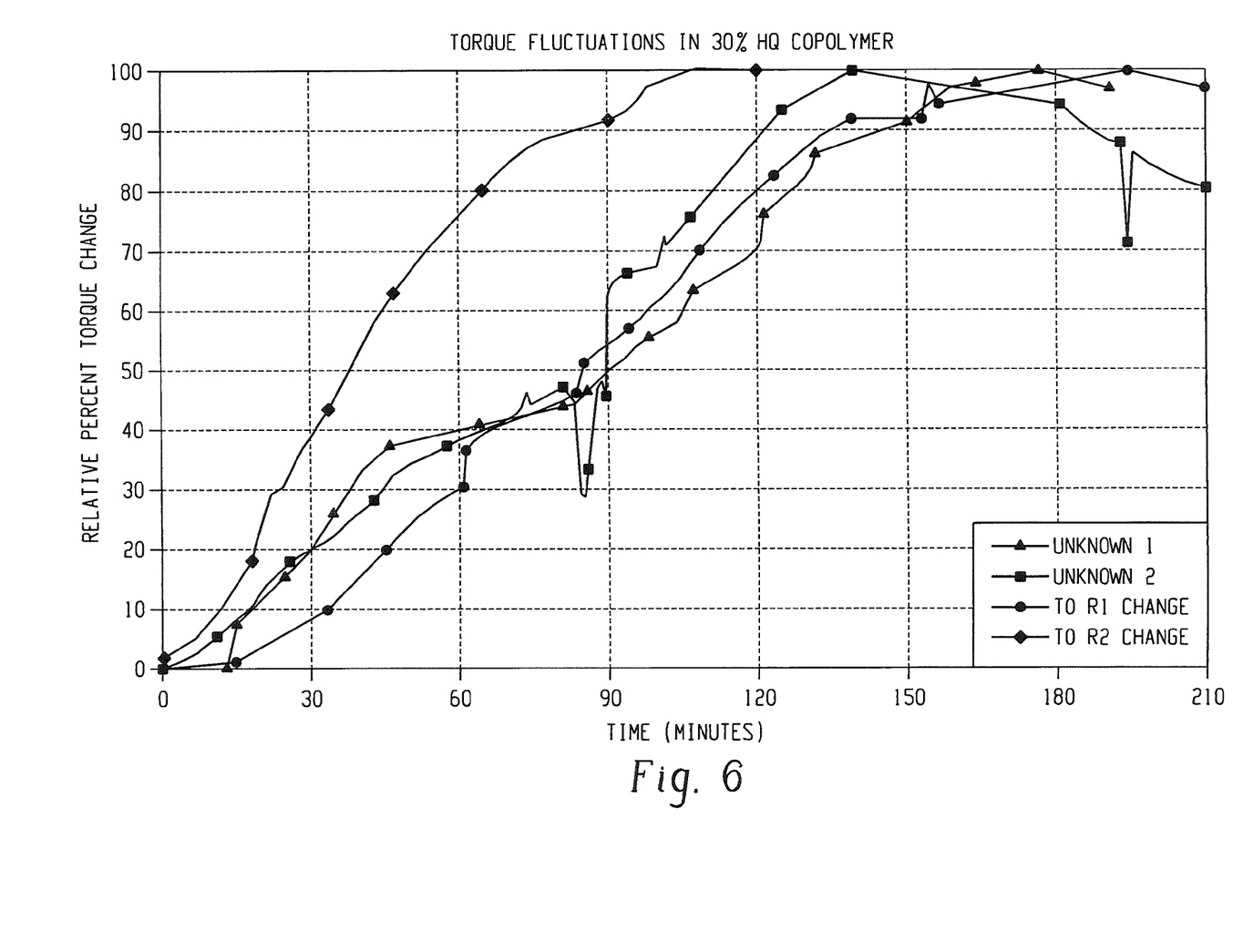
FIG. 6 is a graph illustrating the rate of change of extruder torque in several cases.

A series of experiments was conducted to determine whether the cause of the stoichiometry change observed in FIG. 2 was located in R1 or in R2. The activated diaryl carbonate was BMSC and the dihydroxy compound comprised a combination of bisphenol A and hydroquinone, where bisphenol A was present at 70 mol % and hydroquinone was present at 30 mol %. It was surprisingly discovered that the cause of the stoichiometry change observed in FIG. 2 was located in R1. A series of experiments were conducted in which the rate of change of the extruder torque (i.e., the rate of change of the final product molecular weight) was not controlled in R1 or in R2 ("Unknown 1" and "Unknown 2" in FIG. 6). Differences between the rates of change in torque between R1 and R2 are due to the differences in transition time from each of those reactors to the polymer extruder (i.e., where the final product is made). During these experiments with the "unknown" rate of change, molecular weight spikes similar to that illustrated in FIG. 2 were observed. Another series of experiments was conducted in which the rate of change of the final product molecular weight was varied. In one set of examples, a controlled change of molar ratio in the first stage reactor (R1) was conducted ("to R1 change" in FIG. 6) and in an another set of examples, a controlled change of molar ratio in the second stage reactor (R2) was conducted ("to R2 change" in FIG. 6). The results from these experiments are illustrated in FIG. 6 where the rates of change of torque during the described unknown events of the sudden molecular weight increase are overlayed with the rate of change of torque when the molar ratio changes were originated and controlled in R1 or in R2. The data from the unknown rates of change, when overlayed with the data from the controlled rates of change in R1 and R2, correspond more closely to the data plotted for the change in R1. As can be seen in FIG. 6, the rates of change of torque of two unknown molar ratio upsets are similar to the rate of change of torque when a controlled change was started in R1. This indicates that the cause of the molecular weight variation occurred in R1.

Figure 7:
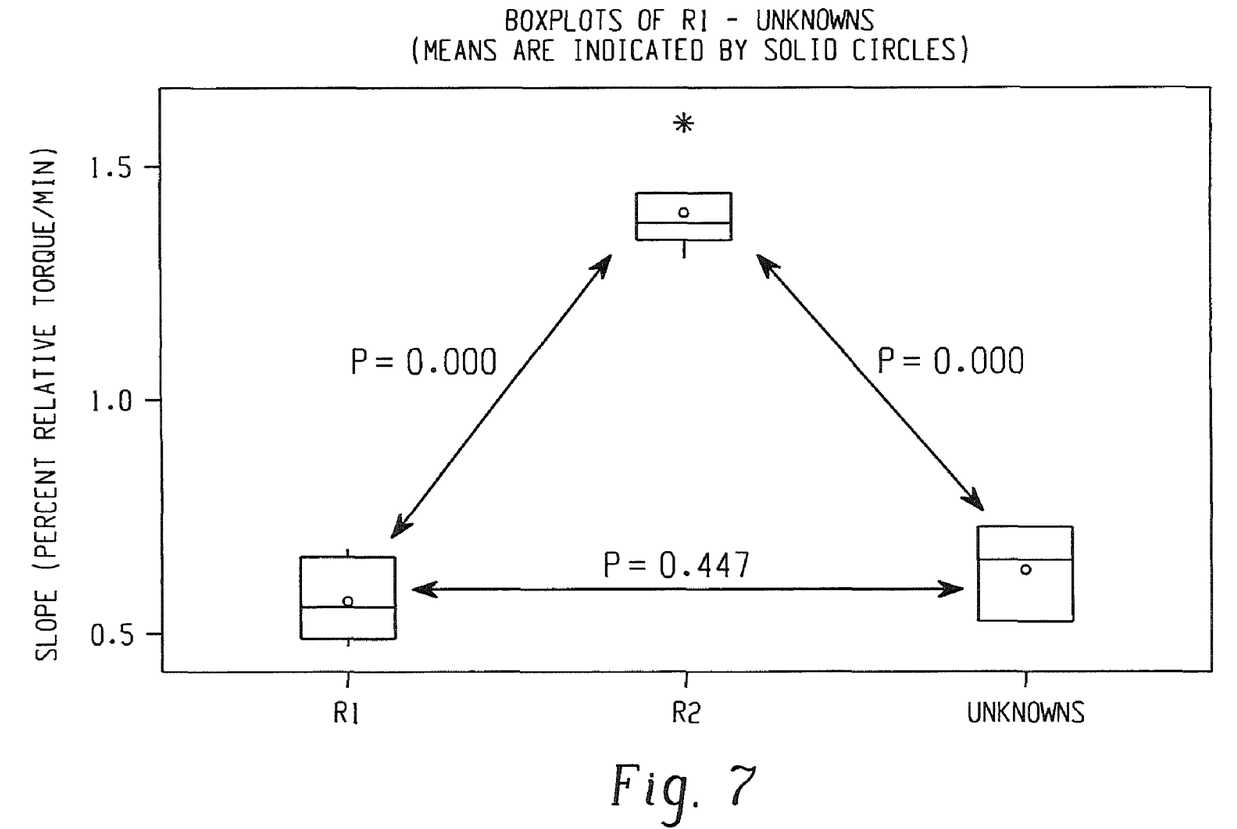
FIG. 7 is chart illustrating the statistical comparison of slopes for various torque rate changes.

An analysis of the data displayed in FIG. 6 was then performed. Specifically, a statistical comparison was completed for the slopes of the rate changes in FIG. 6 corresponding to the changes of the molar ratio in R1, the changes of the molar ratio in R2, and sudden peaks of molecular weight that were unknown. The results of these experiments are illustrated in FIG. 7, where it is demonstrated that there were no statistical significant differences (e.g., p=0.447) between the average rate of change in the torque of the unknown molecular weight variations and the rate of change in the torque when the molar ratio was modified in R1. FIG. 7 further shows that there was a significant statistical difference (e.g., p=0) between the unknown molecular weight events and the ones that originated in R2. FIG. 7 additionally demonstrates that the cause of the molar ratio variations was located in R1 rather than in R2. The experiments illustrated in FIG. 6 and FIG. 7 did not comprise a heated cover in R1 or in R2, but the temperature of the open space and the cover was greater than the melt temperature of the dihydroxy compound(s) in R2.

A further set of experiments was conducted which compared the molecular weight stability in the final product before and after the implementation of the heated reactor cover. Table 1 below illustrates the reactor operating conditions without the heated cover, while Table 2 illustrates the reactor operating conditions with the heated cover. As can be seen from Tables 1 and 2, the temperatures, level, and agitation revolutions per minute (RPM) of R1 were held constant in each experiment. FIG. 5 illustrates the differences observed between the heated versus the unheated reactor covers.

TABLE 1

Reaction Conditions for Unheated Cover

|  | Average | Standard Deviation |
| --- | --- | --- |
| R1 Temperature | 190 | 0.37 |
| R1 Level | 50 | 0.31 |
| R1 Agitation RPM | 650 | 0.76 |

TABLE 2

Reaction Conditions for Heated Cover

|  | Average | Standard Deviation |
| --- | --- | --- |
| R1 Temperature | 190 | 0.25 |
| R1 Level | 50 | 0.23 |
| R1 Agitation RPM | 650 | 0.78 |

As can be seen from FIG. 5 and Tables 3 and 4, the heated cover provides a more even distribution of molecular weight, while the unheated cover provides a highly variable molecular weight distribution illustrated by the many peaks and valleys observed for the unmodified cover design. Tables 3 and 4 summarize the molecular weight values measured that are depicted in FIG. 5, illustrating the standard deviations of each series and showing the reduction in molecular weight variability after the reactor cover was modified.

TABLE 3

Molecular Weight Observations with Unmodified Cover Design

| Sample # | Molecular Weight (Daltons) |
| --- | --- |
| 1 | 64513 |
| 2 | 61144 |
| 3 | 61949 |
| 4 | 54562 |
| 5 | 66777 |
| 6 | 61112 |
| 7 | 61113 |
| 8 | 60204 |
| 9 | 62747 |
| 10 | 62405 |
| 11 | 63171 |
| 12 | 59942 |
| 13 | 67212 |
| 14 | 68670 |
| 15 | 70360 |
| 16 | 70991 |
| 17 | 68752 |
| 18 | 64854 |
| 19 | 63769 |
| 20 | 66083 |
| 21 | 69458 |
| Average | 64735 |
| Standard Deviation | 3467 |

TABLE 4

Molecular Weight Observations with Modified Cover Design

| Sample # | Molecular Weight (Daltons) |
|---|---|
| 1 | 61495 |
| 2 | 62323 |
| 3 | 60316 |
| 4 | 61097 |
| 5 | 61340 |
| 6 | 61150 |
| 7 | 61232 |
| 8 | 60796 |
| 9 | 61593 |
| 10 | 60285 |
| 11 | 59758 |
| 12 | 59210 |
| 13 | 59516 |
| Average | 60778 |
| Standard Deviation | 907 |

FIG. 5 illustrates that by increasing the temperature in a reactor cover (e.g., providing a heated cover or a heated and insulated cover) and maintaining the temperature to about −5° C. of the melting point of the highest melting temperature monomer used in the reaction, the molecular weight can be consistent (less variable). A heated or heated and insulated reactor cover improves the quality of the polymer produced by avoiding degradation and discoloration of the material accumulated and increases molecular weight stability in the final product since stoichiometry modification is avoided.

The singular forms "a," "an," and "the" include plural referents unless the context clearly dictates otherwise. Unless defined otherwise, technical and scientific terms used herein have the same meaning as is commonly understood by one of skill in the art to which this invention belongs. The modifier "about" used in connection with a quantity is inclusive of the stated value and has the meaning dictated by the context (e.g., includes the degree of error associated with measurement of the particular quantity). The terms "front", "back", "bottom", and/or "top" are used herein, unless otherwise noted, merely for convenience of description, and are not limited to any one position or spatial orientation. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants).

"Optional" or "optionally" means that the subsequently described event or circumstance can or cannot occur, and that the description includes instances where the event occurs and instances where it does not. Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of making a polycarbonate, comprising:
    reacting monomers comprising an activated diaryl carbonate and a dihydroxy compound at a reaction temperature in a reactor to form a reaction mixture;
    wherein the reactor comprises a heated cover and an open space between the cover and the reaction mixture;
    wherein the dihydroxy compound comprises a vapor pressure greater than or equal to 0.01 kiloPascals at the reaction temperature; and
    wherein the temperature of the open space in the reactor is greater than or equal to the melt temperature of the monomer having the highest melt temperature.

2. The method of claim 1, wherein the monomer having the highest melt temperature is the dihydroxy compound.

3. The method of claim 2, wherein the dihydroxy compound comprises hydroquinone.

4. The method of claim 1, wherein the dihydroxy compound comprises a combination of hydroquinone and bisphenol A.

5. The method of claim 1, wherein the activated diaryl carbonate comprises bismethylsalicyl carbonate.

6. The method of claim 1, wherein the cover of the reactor is insulated.

7. A method of making a polycarbonate, comprising:
    reacting monomers comprising an activated diaryl carbonate and a dihydroxy compound at a reaction temperature in a reactor to form a reaction mixture;
    wherein the reactor comprises a heated cover and an open space between the cover and the reaction mixture;
    wherein the dihydroxy compound comprises a vapor pressure greater than or equal to 0.01 kiloPascals at the reaction temperature; and
    wherein the temperature of the cover is greater than or equal to the melt temperature of the monomer having the highest melt temperature.

8. The method of claim 7, wherein the monomer having the highest melt temperature is the dihydroxy compound.

9. The method of claim 8, wherein the dihydroxy compound comprises hydroquinone.

10. The method of claim 7, wherein the dihydroxy compound comprises a combination of hydroquinone and bisphenol A.

11. The method of claim 7, wherein the activated diaryl carbonate comprises bismethylsalicyl carbonate.

12. The method of claim 7, wherein the cover of the reactor is insulated.

13. A method of making a polycarbonate, comprising:
    reacting monomers comprising an activated diaryl carbonate and a dihydroxy compound at a reaction temperature in a reactor to form a reaction mixture;
    wherein the reactor comprises a heated cover and an open space between the cover and the reaction mixture;

wherein the dihydroxy compound comprises a vapor pressure greater than or equal to 0.01 kiloPascals at the reaction temperature;

wherein the temperature of the open space in the reactor is less than the melt temperature of the monomer having the highest melt temperature; and wherein the temperature of the cover is greater than or equal to the melt temperature of the monomer having the highest melt temperature.

14. The method of claim 13, wherein the monomer having the highest melt temperature is the dihydroxy compound.

15. The method of claim 14, wherein the dihydroxy compound comprises hydroquinone.

16. The method of claim 13, wherein the dihydroxy compound comprises a combination of hydroquinone and bisphenol A.

17. The method of claim 13, wherein the activated diaryl carbonate comprises bismethylsalicyl carbonate.

18. The method of claim 13, wherein the cover of the reactor is insulated.

* * * * *